United States Patent [19]

Kish

[11] Patent Number: 5,275,316

[45] Date of Patent: Jan. 4, 1994

[54] FISHERMAN'S BACK PACK

[76] Inventor: William D. Kish, 47444 N. Division St., Lancaster, Calif. 93535

[21] Appl. No.: 940,837

[22] Filed: Sep. 4, 1992

[51] Int. Cl.⁵ .............................................. A45F 3/08
[52] U.S. Cl. .................................. 224/210; 224/209; 224/259; 224/261
[58] Field of Search ............... 224/210, 209, 213, 230, 224/235, 259, 261, 920, 922, 206, 153, 157; 24/660, 482, 17; 2/272, 247; 220/403; 383/111, 113

[56] References Cited

U.S. PATENT DOCUMENTS

| 2,899,731 | 8/1959 | Maxim | 24/660 |
| 4,527,350 | 7/1985 | Tockey, Jr. | 234/920 |
| 4,648,121 | 3/1987 | Lowe | 224/209 |
| 4,809,892 | 3/1989 | Chinski et al. | 224/153 |
| 4,940,173 | 7/1990 | Jacober | 224/209 |

Primary Examiner—Ernest G. Cusick
Assistant Examiner—David J. Walczak
Attorney, Agent, or Firm—Leon Gilden

[57] ABSTRACT

A back pack arranged for use by fishermen, to include a first housing for containment of fishing paraphernalia and clothing storage cooperative with a removable fish storage bag for ease of cleaning and manipulation thereof. A bait box having a removable fluid impermeable liner is mounted to a front wall of the housing, with fishing gear pockets mounted to at least one of the side walls of the housing. A rigid framework having a U-shaped base is mounted at an intersection of the floor and side wall and front wall structure of the housing to include parallel frame legs extending at a junction of the rear wall and side walls of the housing terminating in fishing pole mounting tubes. Each of the fishing pole mounting tubes includes a matrix of resilient projections projecting radially into the tubes for securement of a fishing pole during a fishing procedure.

3 Claims, 3 Drawing Sheets

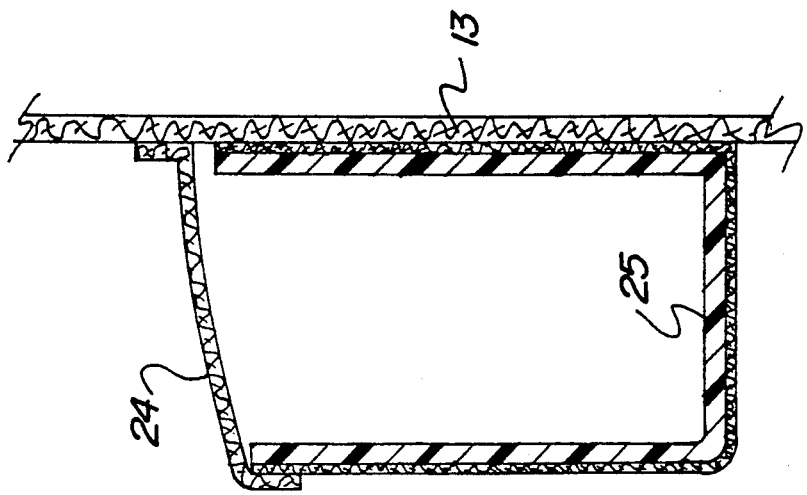
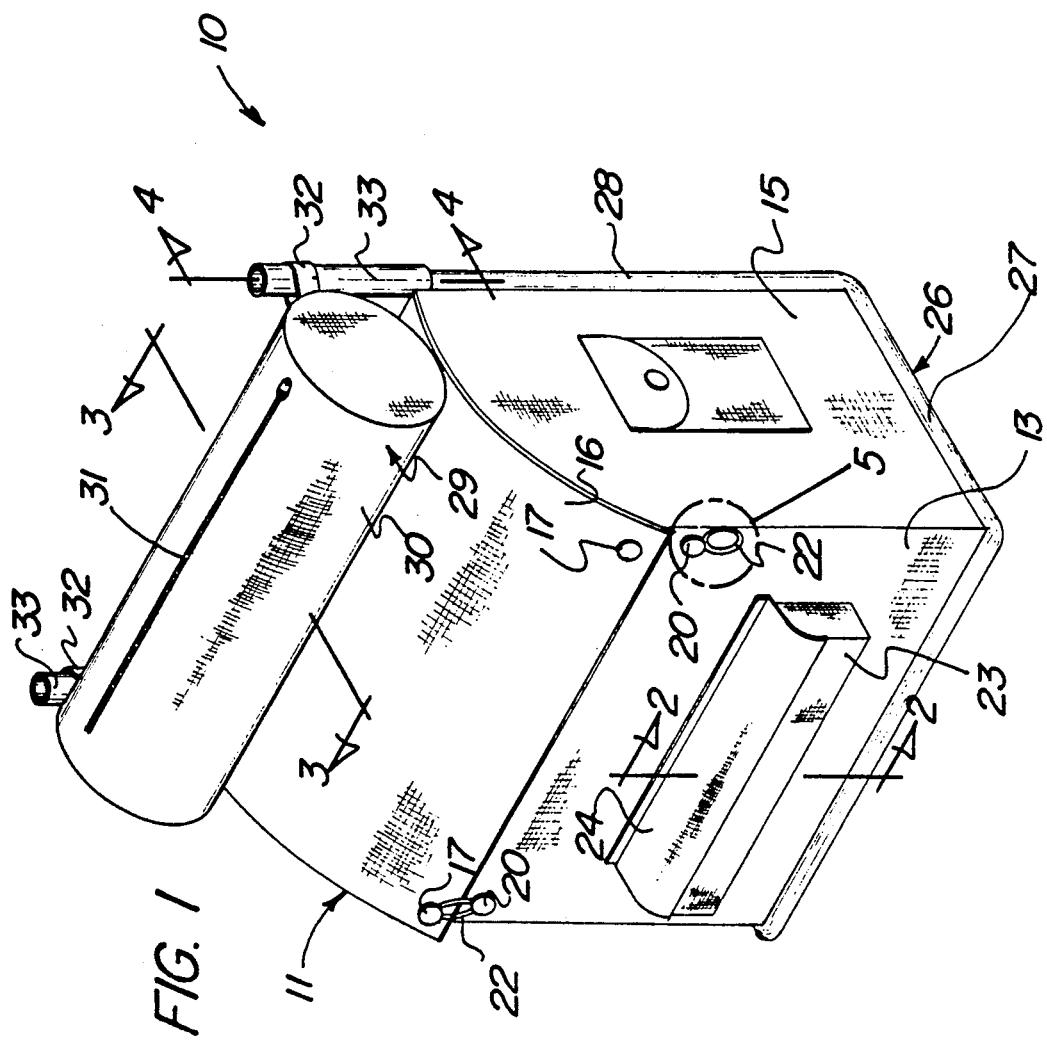

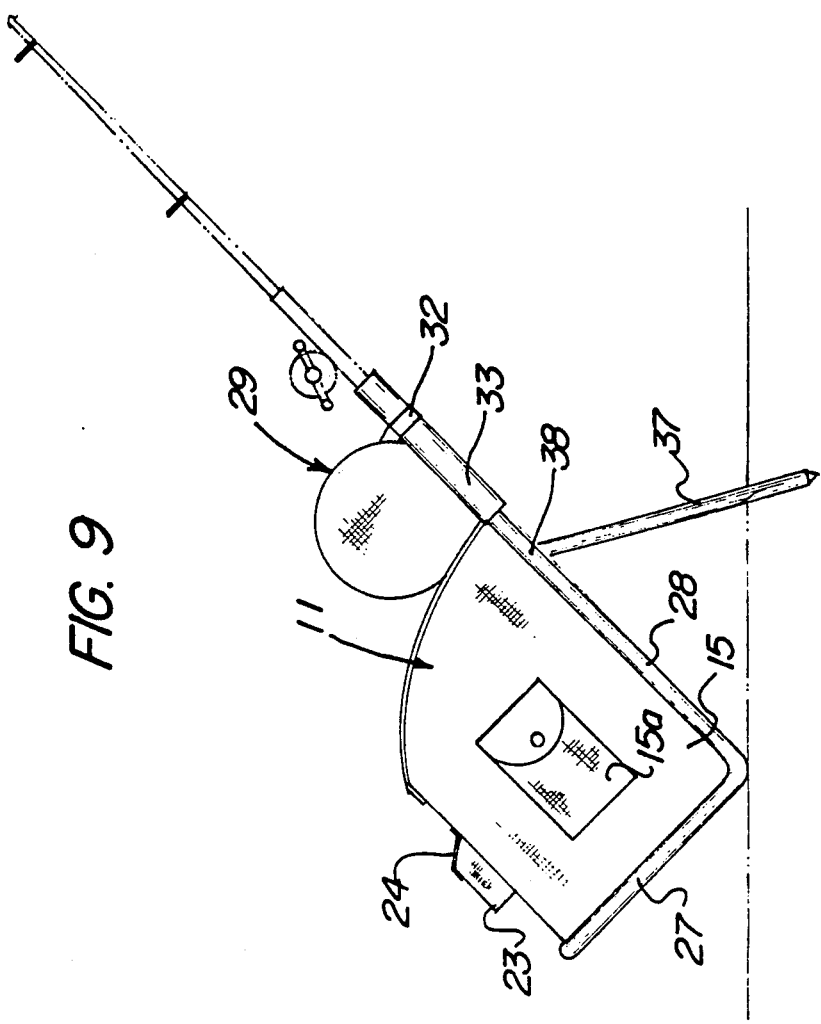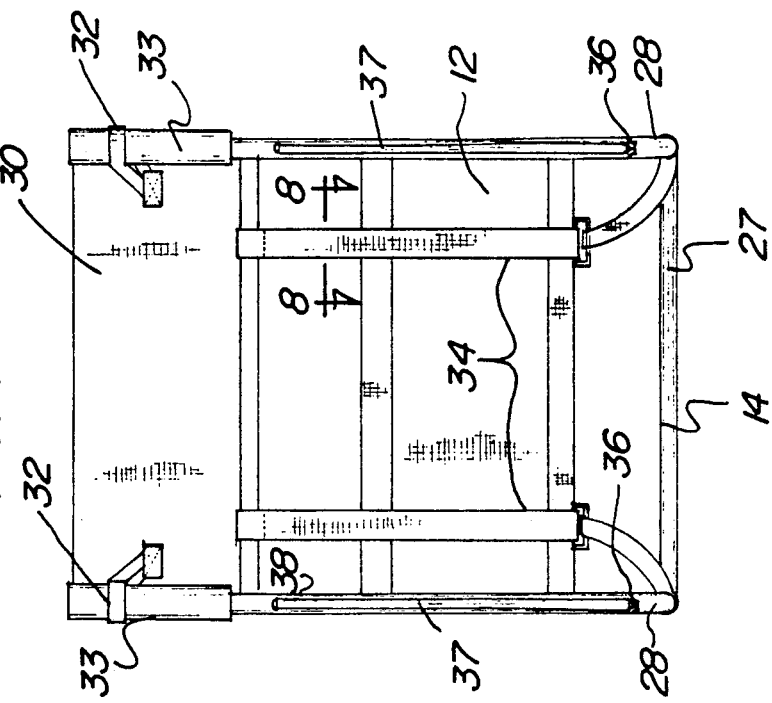

FISHERMAN'S BACK PACK

BACKGROUND OF THE INVENTION

1. Field of the Invention

The field of invention relates to back pack structure, and more particularly pertains to a new and improved fisherman's back pack arranged to support various components and render assistance in a fishing procedure.

2. Description of the Prior Art

Back packs of various types have been utilized throughout the prior art and exemplified by such U.S. patent as set forth in U.S. Pat. Nos. 4,793,534; 4,871,101; 4,896,804; and 4,938,400.

The instant invention addresses deficiencies of the prior art by presenting a fisherman's back pack structure specifically directed to the containment of various components and assistance in a fishing procedure and in this respect, the present invention substantially fulfills this need.

SUMMARY OF THE INVENTION

In view of the foregoing disadvantages inherent in the known types of back pack apparatus now present in the prior art, the present invention provides a fisherman's back pack having modular components for storage of various aspects of a fishing organization. As such, the general purpose of the present invention, which will be described subsequently in greater detail, is to provide a new and improved fisherman's back pack which has all the advantages of the prior art back pack apparatus and none of the disadvantages.

To attain this, the present invention provides a back pack arranged for use by fishermen, to include a first housing for containment of fishing paraphernalia and clothing storage cooperative with a removable fish storage bag for ease of cleaning and manipulation thereof. A bait box having a removable fluid impermeable liner is mounted to a front wall of the housing, with fishing gear pockets mounted to at least one of the side walls of the housing. A rigid framework having a U-shaped base is mounted at an intersection of the floor and side wall and front wall structure of the housing to include parallel frame legs extending at a junction of the rear wall and side walls of the housing terminating in fishing pole mounting tubes. Each of the fishing pole mounting tubes includes a matrix of resilient projections projecting radially into the tubes for securement of a fishing pole during a fishing procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fisherman's back pack which has all the advantages of the prior art back apparatus and none of the disadvantages.

It is another object of the present invention to provide a new and improved fisherman's back pack which may be easily and efficiently manufactured and marketed.

It is a further object of the present invention to provide a new and improved fisherman's back pack which is of a durable and reliable construction.

An even further object of the present invention is to provide a new and improved fisherman's back pack which is susceptible of a low cost of manufacture with regard to both materials and labor, and which accordingly is then susceptible of low prices of sale to the consuming public, thereby making such fisherman's back pack economically available to the buying public.

Still yet another object of the present invention is to provide a new and improved fisherman's back pack which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 7 is an orthographic rear view of the invention.

FIG. 8 is an orthographic view, taken along the lines 8—8 of FIG. 7 in the direction indicated by the arrows.

FIG. 9 is an orthographic view of the invention arranged in a mounted orientation having the support legs pivoted exteriorly of the support tube structure for mounting a fishing pole.

DESCRIPTION OF THE PREFERRED EMBODIMENT

Figure 3:
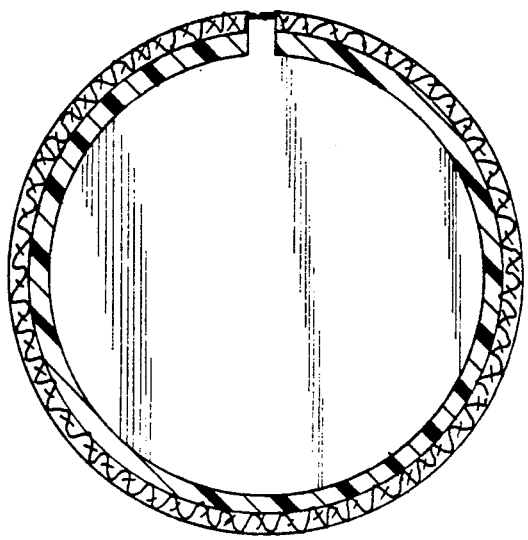
FIG. 3 is an orthographic view, taken along the lines 3—3 of FIG. 1 in the direction indicated by the arrows.
Figure 5:
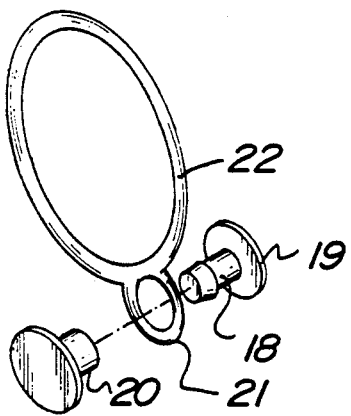
FIG. 5 is an enlarged isometric illustration of section 5 as set forth in FIG. 1.
Figure 4:
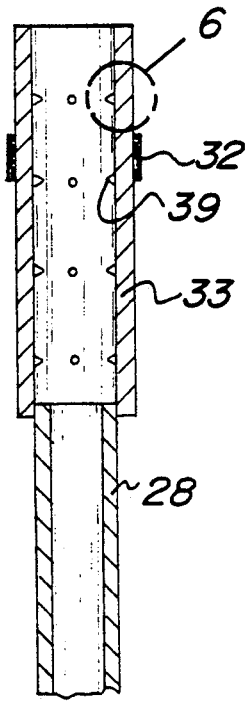
FIG. 4 is an orthographic view, taken along the lines 4—4 of FIG. 1 in the direction indicated by the arrows.
Figure 6:
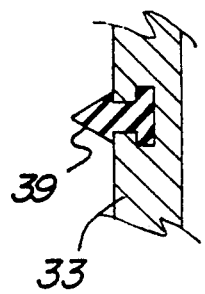
FIG. 6 is an enlarged view of section 6 as set forth in FIG. 4.

With reference now to the drawings, and in particular to FIGS. 1 to 9 thereof, a new and improved fisherman's back pack embodying the principles and concepts of the present invention and generally designated by the reference numeral 10 will be described.

More specifically, the fisherman's back pack 10 of the instant invention essentially comprises a first flexible housing 11 having a first housing rear wall 12 spaced from a first housing front wall 13. A first housing floor 14 is provided with spaced first housing parallel side walls 15. At least one of the side walls 15 includes a pocket and closure flap structure 15a for positioning tackle and the like for use in fishing. The first housing further includes a top wall flap 16 hingedly mounted to the upper distal end of the first housing rear wall 12. A plurality of buttons 17 are mounted to the top wall flap 16 adjacent its free distal end for operative association with a latch mechanism, as indicated in detail in FIG. 5. The latch mechanism includes a latch plug 18 in operative cooperation with one of the buttons 17. Each latch plug 18 is mounted to the front wall 13, having a latch plug base 19 and specifically each latch plug 18 is arranged to receive a latch plug cap 20. A first ring 21 is captured between the cap 20 resiliently secured onto the latch plug 18 and plug base 19, with a first ring 21 mounted about the cap 20 having a second resilient ring 22 arranged for securement about an adjacent button 17. In this manner, the ring structure may be moved relative to the latch plug 18 when an individual's hands are slippery to provide further ease of opening of the flap 16.

A bait pouch 23 is mounted to the first housing front wall 13, with the base pouch 23 having a pouch cover lid 24. A removable fluid impermeable liner 25 is coextensive with the bait pouches side walls and floor for permitting ease of cleaning (see FIG. 2). The removable liner is accordingly complementarily received within the bait pouch 23 in contiguous communication with the bait pouch side walls and floor.

A rigid frame 26 is provided having a U-shaped base frame 27 mounted to an intersection of the housing front wall and side walls with the floor 14. The U-shaped frame 27 includes a plurality of parallel and coextensive rear wall frame leg tubes 28 that extend along an intersection of the rear wall with each side wall. The frame leg tubes extend upwardly beyond the housing top wall flap 16, to each include a fishing pole mounting tube 33 coaxially aligned and fixedly mounted to upper distal ends of each of the frame leg tubes 28.

Each of the fishing pole mounting tubes 33 includes a matrix of resilient projections 39 (see FIG. 4) that are radially directed interiorly of a respective fishing pole mounting tube 33 to position and orient a fishing pole in a manner as indicated in FIG. 9 in operative use of the organization in a fishing procedure.

A fish storage pack 29 is provided, having a continuous side wall 30 and a zipper closure 31 for access interiorly of the storage bag 29. The side wall 30 includes a plurality of support loops 32, with each of the support loops 32 arranged for sliding reception about an associated fishing pole mounting tube 33 to permit ease of removal of a fishing storage pack 29 relative to the first housing 11. A plurality of shoulder straps 34 are provided, each having a central cushioned core 35 (see FIG. 8) for ease of transport of the organization, wherein the shoulder straps 34 are mounted to the rear wall and extend from an orientation of an upper distal end of the rear wall 12 to the intersection of the frame leg tubes 28 with the U-shaped base frame 27. The shoulder straps are arranged in a spaced relationship in adjacency to a respective frame leg tube 28, as indicated.

Each of the frame leg tubes 28 includes a leg cavity 36, with each leg cavity 36 having a support leg 37 pivotally mounted at an upper distal end of the support leg 37 within a respective cavity 36 about an axle 38. In this manner, each support leg 37 is arranged for pivoting projection exteriorly of a respective cavity for mounting the back pack structure to an underlying support to permit mounting of an associated fishing pole, as indicated in phantom in FIG. 9.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fisherman's back pack, comprising,
   a first flexible housing, the first flexible housing having a rear wall, a front wall spaced from the rear wall and coextensive therewith, a floor, and spaced side walls, with a first housing flap hingedly mounted to the rear wall extending over the side walls and having fastening means for securement to the front wall, and
   a bait pouch mounted on the front wall, the bait pouch having a pouch cover lid and a pouch cavity, with the pouch cavity including a removable fluid impermeable liner coextensively mounted within the bait pouch and slidably removable therefrom, wherein the bait pouch includes a continuous pouch side wall and a pouch floor, with the liner arranged for contiguous communication with the pouch floor and the pouch side wall, and attachment means mounted to the first housing for permitting attachment of the first housing to a wearer, and the fastening means includes at least one latch plug mounted to the front wall above the bait pouch, the latch plug having a latch plug base fixedly mounted to the front wall, and the latch plug further including a resilient latch plug cap receiving the latch plug base, and a first ring slidably mounted about the cap between the cap and the latch plug base, with the first ring having a second resilient ring, and the first housing flap having a button, wherein the second ring is arranged for receiving the button to secure the first housing flap to the front wall, and a rigid frame, the rigid frame having a U-shaped base frame, with the base frame mounted to the first housing floor at an intersection of the first housing floor, with the first housing front wall and the first housing side walls, and the U-shaped base frame including parallel and coextensive frame leg tubes extending along the first housing as a further intersection of the first housing rear wall and the first housing side walls, and each frame leg tube includes a fishing pole mounting tube, with each fishing pole mounting tube extending beyond the first housing rear wall, and each mounting tube including a matrix of resilient projections radially aligned within each of said frame leg tubes for frictional engagement of a fishing pole positioned therewithin.

2. A fisherman's back pack as set forth in claim 1 including a fish storage bag, the fish storage bag having a storage bag continuous side wall, with a zipper closure mounted to the continuous side wall, and a plurality of support loops mounted to the storage bag, with each of said support loops slidably receiving one of said fishing pole mounting tubes therethrough.

3. A fisherman's back pack as set forth in claim 2 wherein each frame leg tube includes a tube cavity, and each tube cavity has the support leg positioned therewithin, and each support leg includes a support leg axle pivotally mounting each support leg within one of said frame leg tubes.

* * * * *